Oct. 23, 1962  R. G. SARGEANT  3,060,297
ELECTRICAL APPARATUS FOR REMOVING WATER
FROM LIQUID MIXTURES
Original Filed Sept. 22, 1959  3 Sheets-Sheet 1

INVENTOR
Ralph G. Sargeant

BY *J. Hanson Boyden*

ATTORNEY

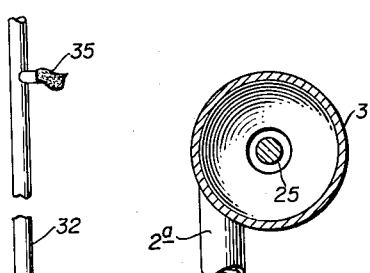
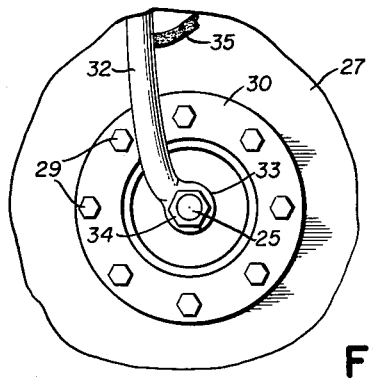
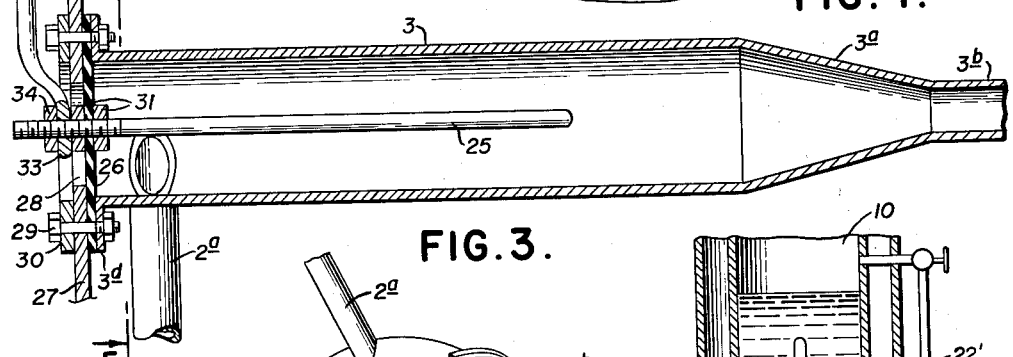
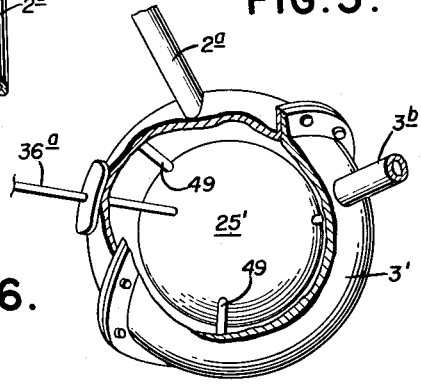
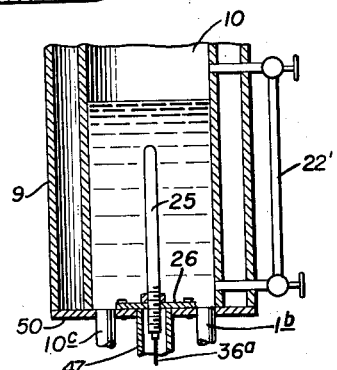
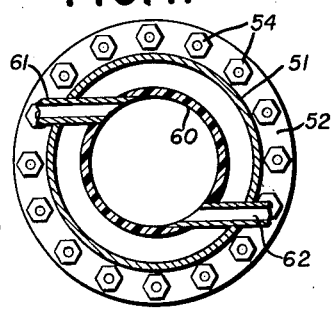
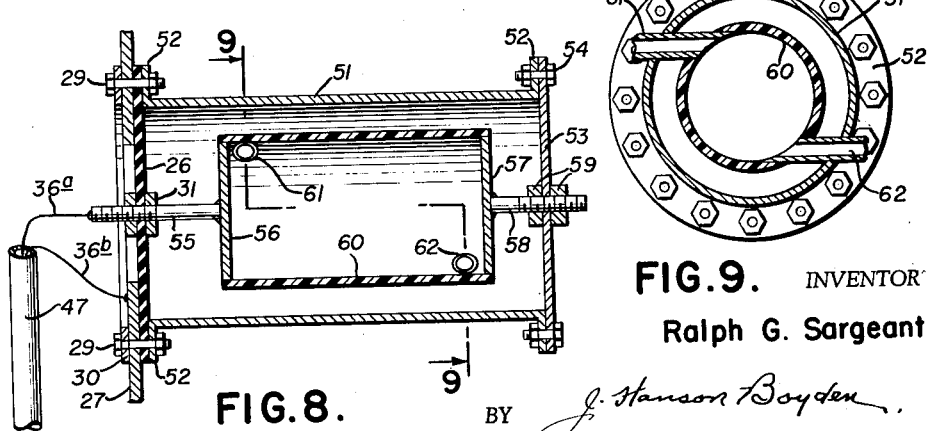
INVENTOR
Ralph G. Sargeant
BY J. Hanson Boyden
ATTORNEY INVENTOR
Ralph G. Sargeant BY *J. Hanson Boyden*,

ATTORNEY 3,060,297
ELECTRICAL APPARATUS FOR REMOVING WATER FROM LIQUID MIXTURES
Ralph G. Sargeant, 408 W. Windsor St., Lakeland, Fla.
Original application Sept. 22, 1959, Ser. No. 841,478. Divided and this application Feb. 14, 1961, Ser. No. 89,226
5 Claims. (Cl. 219—10.65)

This invention relates to apparatus for removing water by evaporation from liquid mixtures containing water and other components. It is particularly advantageous for use with heat sensitive liquid materials.

As examples of processes to which the invention is applicable may be mentioned the concentration of fruit juices, such as citrus juices, and the removal from hydrocarbon and other oils and liquid fuels of any water which may have become mixed therewith.

The present application is a division of my prior copending application Serial Number 841,478, filed September 22, 1959.

As set forth in said prior application, the present invention is based on the use of so-called "dielectric heating," that is to say, the application to the liquid being treated of very high frequency electric oscillations, having a frequency, for example, on the order of 10 to 20 megacycles, more or less.

The invention will first be discussed in connection with the production of concentrated fruit juices, such as organge juice, since this presents special problems.

Commercially, the juice is evaporated by means of steam evaporators, which are similar in construction to water-tube boilers. The vertical tubes are surrounded by hot steam, and the juice flows by gravity down the tubes, under a partial vacuum. No matter how high the vacuum, or how carefully the temperature is regulated, parts of the juice are overheated, caramelized, or given a "cooked" off flavor. This is due to the fact that the walls of the steam heated tubes are too hot, and although the juice may flow along the tubes in the form of a film, the portions of this film in actual contact with the hot walls of the tube become overheated.

For the reasons hereinbefore set forth, it has never been possible, so far as I am aware, to produce a satisfactory 65° Brix concentrate by means of steam evaporators of any kind.

One object of the present invention is, therefore, to produce a high density concentrate which shall be free from any "cooked" or off flavor, and without any caramelization.

Still another object of the invention is to produce a concentrate of a density of at least 65° Brix, which, when reconstituted by the addition of water, will yield a drink of acceptable taste and flavor.

I achieve the foregoing objects by applying to the juice being concentrated very high frequency electric oscillations, and an additional object is to devise special apparatus by means of which these oscillations may be effectively applied. This special apparatus includes a novel form of electrode, and is useful not only in concentrating fruit juices, but also in evaporating water from any liquid mixture from which it is desired to remove the water.

It is believed that such high frequency oscillations set up electric currents which traverse the liquid materials being treated, and which, in some cases at least, generate heat within these materials.

The rate at which heat is thus generated depends upon the "loss factor," a factor which is directly proportional to what is known as the "dielectric constant" of the material. Dielectric constants vary for different materials, that for water, being about 80. The dielectric constant of water is from ten to eighty times greater than that of any other material with which water is ordinarily associated, and therefore water, when subjected to a high frequency field, heats at a much more rapid rate than any other such substance or material.

The action of such high frequency oscillations or field on liquid mixtures is not entirely understood, but it seems probable that in some cases, instead of or in addition to the selective heating effect, the oscillations produce other selective effects on the different components, possibly related to the above mentioned "dielectric constant" of each particular material.

With the above and other objects in view, and to improve generally on the details of such apparatus, the invention consists in the method and in the combination and arrangement of parts hereinafter described and claimed, and illustrated in the accompanying drawings, forming part of this specification, and in which:

FIG. 3 is a vertical longitudinal section on an enlarged scale through my improved electrode structure;

FIG. 4 is an end elevation of the apparatus shown in FIG. 3, looking from the left;

FIG. 5 is a transverse section substantially on the line 5—5 of FIG. 3, looking in the direction of the arrows;

FIG. 6 is a perspective view of a modified form of electrode structure, parts being broken away;

FIG. 7 is a fragmentary vertical section through the lower part of the evaporating chamber, showing another modified arrangement of electrode;

FIG. 8 is a longitudinal section through a still further modified electrode structure;

FIG. 9 is a transverse section substantially on the line 9—9 of FIG. 8, looking in the direction of the arrows.

Although satisfactory results can be and have been obtained by concentrating the whole juice, it is advantageous in some cases to separate the juice by means of a suitable centrifuge, into two components, one comprising the water-containing portion and the other the so-called estercarrying portion, and to concentrate only the water-containing component.

This water-containing component constitutes approximately eighty percent of the entire juice, and contains most of the acids and sugars present in the juice. The other twenty percent contains the lipids, cellulose, pectin complexes and pigments (anthocyanides).

In the commercial preparation of orange juice, the material, after having been crushed or disintegrated, is usually passed through what is know as a "juice finisher," the purpose of which is to separate the juice from the seeds, pulp, etc.

Figure 1:
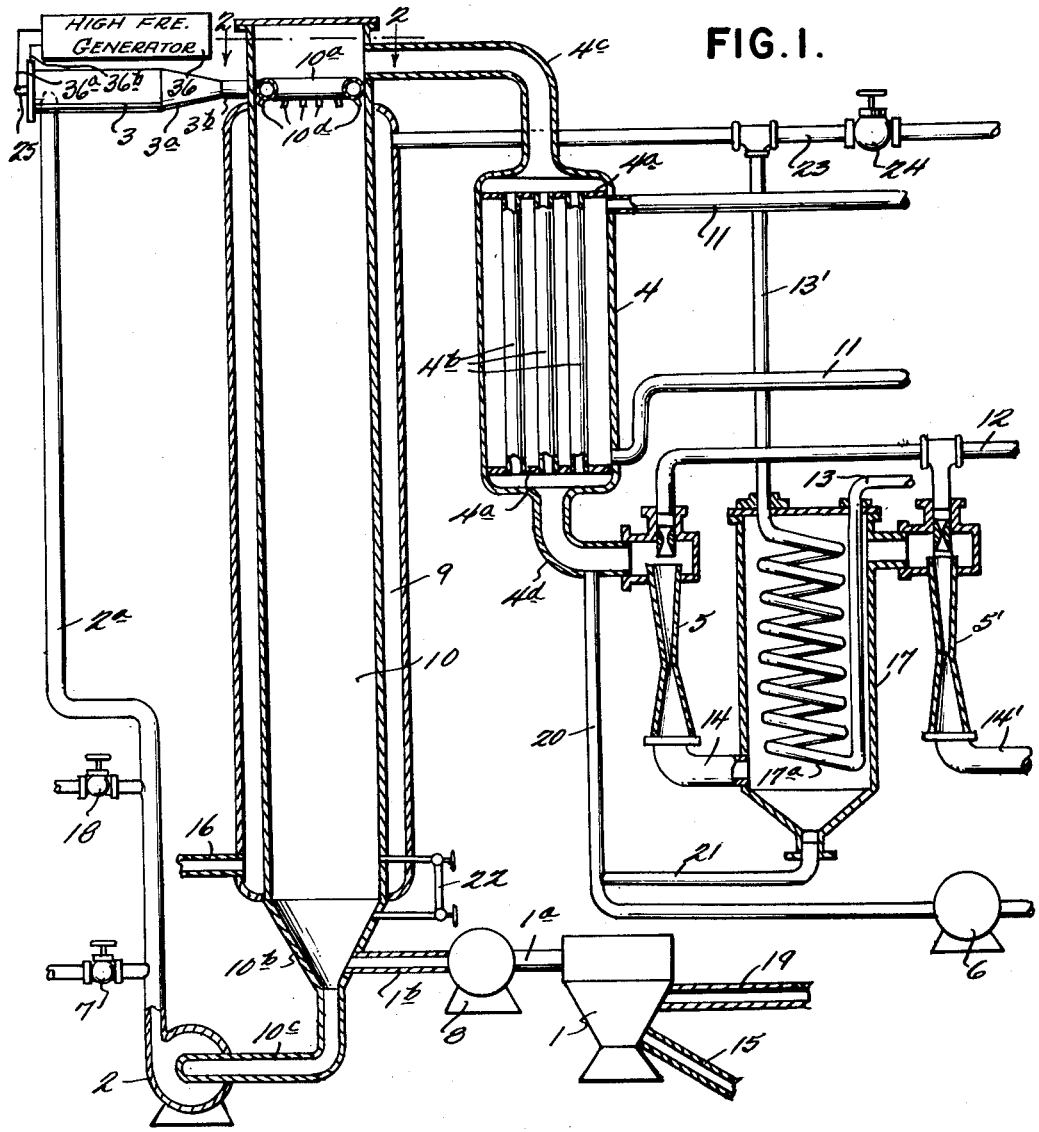
FIG. 1 is a schematic view of the essential equipment used in carrying out one form of the invention.

Referring to the drawings in detail, and more especially first to FIG. 1, the juice from the finisher is fed into the centrifuge 1 through pipe 19. The water-containing portion is delivered from the centrifuge through pipe 1$^a$ to a suitable pump 8, from which it is delivered through a pipe 1$^b$ to the conical bottom 10$^b$ of an evaporating chamber 10.

From the lower end of the conical bottom 10$^b$ extends a pipe 10$^c$ to a centrifugal pump 2 which forces the liquid material up through a vertical pipe 2$^a$ to the top of the evaporating chamber 10 where it is delivered to a spray head 10$^a$ which directs the material into contact with the vertical walls of the evaporating chamber. The material then flows down these walls to the conical bottom 10$^b$ where it is again recirculated or recycled by the pump 2.

Figure 2:
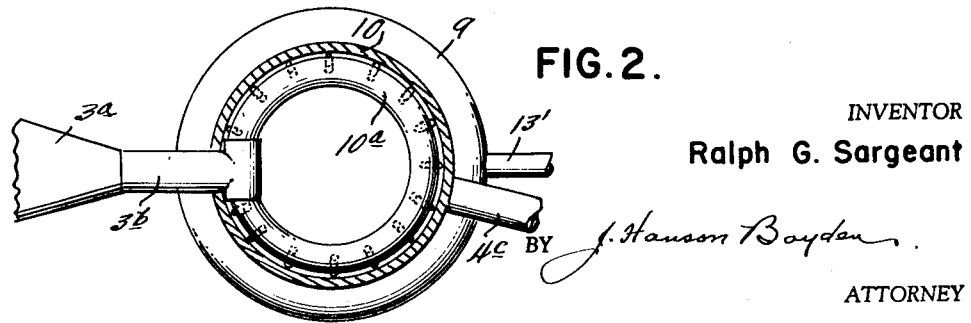
FIG. 2 is a sectional plan view on an enlarged scale substantially on the line 2—2 of FIG. 1.

The preferred construction of the spray head is best shown in FIG. 2. It consists of an annular or ring-shaped pipe having a series of nozzles $10^d$ projecting outwardly and downwardly from its lower side, so as to spray the liquid against the walls of the chamber.

Interposed in the pipe $2^a$ is a dielectric heating device or electrode structure 3 through which the liquids circulate. The details of the preferred form of this device are shown in FIGS. 3 to 5. It consists of a horizontally disposed cylindrical casing or shell having a restricted conical or tapering end $3^a$, discharging axially of the casing into a pipe $3^b$ connected with the spray head $10^a$. Mounted at the other end of the cylindrical structure and extending axially thereof is a central electrode in the form of a rod 25, so that an annular space is provided between this rod and the cylindrical shell. This central electrode, which is shorter than the cylindrical shell, is supported wholly at one end, the other end, adjacent the conical or tapering portion of the shell, being free. The pipe $2^a$, which feeds the liquid into the electrode structure, is arranged to deliver the same tangentially into the cylindrical shell adjacent the end at which the electrode rod is mounted, so that the liquid tends to whirl around the annular space as it travels toward the discharge end of the shell. This whirling movement of the liquid tends to prevent deposits on the inner surface of the cylindrical shell and keep such surface clean. Furthermore, it may be desirable in some cases to apply to the surface a protective coating of some suitable material such as a silicone, to prevent adhesion.

The inner electrode or rod is supported by a disc 26 of insulating material, to which it is clamped by means of nuts 31, and the disc itself may conveniently be supported on the wall 27 of a suitable housing having an opening 28. The end of the cylinderical shell or outer electrode is shown as flanged at $3^d$, and this flange is secured to the wall 27 by means of bolts 29 passing through the flange, the wall 27, and a clamping ring 30. The central electrode is connected with one terminal of a suitable high-frequency generator by means of a conductor 32, secured to the threaded end of the rod 25 by means of a nut 34. Preferably, and as shown, this conductor is in the form of a copper tube, having its end flattened and perforated as at 33, for attachment to the electrode rod, and cooled by water circulating therethrough by means of hose connections 35. Owing to the "skin effect" of high frequency currents, the electrical energy is carried mostly on the surface of the electrode rod 25, and it is advantageous to have this rod, which may be of stainless steel, plated with a good conducting, non-corrosive metal such as silver.

In use, the electrode structure is connected with the two sides of a high-frequency generator 36, one side being connected through a well insulated lead $36^a$ with the central rod 25, and the other side connected by lead $36^b$ with the electrode shell or casing, which is grounded. Preferably, and as usual in the art, such connection is made by means of a co-axial cable 47, as indicated in FIG. 7.

The ester-carrying components of the juice are discharged from the centrifuge 1 through the pipe 15 to a suitably refrigerated storage tank, where they are held in storage until the water-carrying component which is being recirculated through the evaporating chamber as above described has reached the desired concentration. Samples of the product can be withdrawn from time to time through spigot 18 for testing, to determine when the desired concentration has been reached. This concentrated component is then withdrawn through valve 7 and recombined with the stored ester-carrying component to produce the desired final product.

By thus separating the juice into two components and evaporating only one of these components, a very substantial saving in power results, and the time cycle is also greatly reduced. Furthermore, the ester-carrying components of the juice are not exposed to any heat whatever and consequently the natural flavor is preserved.

From the top of the evaporating chamber 10 extends a pipe $4^c$ to a condenser 4 of any suitable type shown as a shell and tube condenser having tube sheets or bulk heads $4^a$ adjacent each end, between which extend tubes $4^b$.

A pipe $4^d$ extends from the bottom of the condenser 4 to a steam-operated air ejector 5, supplied with steam through a pipe 12. This ejector draws the vapors from the evaporating chamber down through the tubes of the condenser 4, and the steam and vapors are delivered from the ejector 5 through a pipe 14 into an intercondenser 17. A second air ejector 5' draws the uncondensed steam and vapors from the condenser 17 and discharges through pipe 14' to atmosphere.

To eliminate the costly construction required with a barometric condenser such as is commonly used for this purpose, I employ a surface-type condenser, containing a coil $17^a$. Water is fed to one end of this coil by a pipe 13, and from the other end extends a pipe 13' to a jacket 9 which surrounds the evaporating chamber 10. Thus the water which is heated in the coil $17^a$ by the steam and vapors from the air ejector 5 is utilized to transfer this heat to the walls of the evaporating chamber 10. As the liquid material flows down inside of these walls, it is maintained at a relatively warm temperature by the water jacket 9 and prevented from cooling off substantially as it otherwise would do. A pipe 23, controlled by a valve 24, is connected with pipe 13', and through this pipe 23 cold water may be admitted to regulate the temperature of the jacket 9 as desired.

By way of example, it may be stated that by means of the air ejector above described, a vacuum is maintained on the evaporating chamber to an extent of at least 29½ inches, so that the water contained in the liquid mixture being treated evaporates at about 70° F., and the temperature of the water jacket 9 is such that the temperature of the liquid being evaporated as it flows down the walls of the chamber 10 does not fall substantially below 75° F. By virtue of utilizing the heat from the condenser 17 by means of this water jacket 9, the amount of power required to be delivered to the electrode structure 3 is greatly reduced, thus effecting a substantial economy. In practice, the level of the liquid being treated in the evaporating chamber is maintained approximately at the upper end of the conical bottom $10^b$, thus permitting the liquid to flow down the entire length of the water-jacketed walls. In order to observe the level of the liquid in the evaporating chamber, a sight glass 22 is preferably provided adjacent the bottom thereof.

A suitable refrigerating medium such as "Freon" gas is supplied to the condenser 4 by pipes 11, from a suitable compressor, in a well-known manner, this apparatus being so designed as to maintain the condenser 4 at a temperature of approximately 50° F. Thus the vapors coming off through pipe $4^c$ are mostly condensed, and the condensate flows out from the bottom of the condenser through pipe 20 to a pump 6. A pipe 21 from the bottom of condenser 17 delivers additional condensate into the pipe 20.

Water fed into the condenser coil $17^a$ may be derived from any suitable source, but a further economy may be achieved by utilizing water from the condenser of the compressor supplying the refrigerating medium to condenser 4, as above described. Thus, water may be caused to flow continuously first through the compressor condenser and then through the coil $17^a$ to the jacket 9, from which it escapes through pipe 16. This water absorbs heat from the compressor condenser and is somewhat warm when it enters the coil $17^a$. It is then further heated by the steam from ejector 5, before passing on to the water jacket.

While I have shown and described a centrifuge for separating the fresh juice into two components, only one of which is subjected to evaporation, it will of course be understood that the separating step may be omitted if desired and the whole juice concentrated by means of my improved evaporator system. This has been done successfully.

Referring again to FIG. 1, the pipe 2ª is slightly larger than the restricted outlet 3ᵇ discharging the juice from the electrode structure, so that the pump 2 tends to generate a substantial pressure within the electrode structure. Thus the high frequency electrical energy is applied to the juice while it is under pressure.

Furthermore, the sum total of the areas of the spray nozzles 10ᵇ is preferably somewhat greater than the cross sectional area of the restricted discharge 3ᵇ, with the result that the pressure in the spray head 10ª is somewhat less than in the electrode structure.

The high frequency generator 36 which I employ is of the well known type embodying one or more oscillating thermionic tubes. The exact frequency is not critical, but should be what is known as radio frequency. For example, a frequency of 60 cycles per second, such as ordinary house current, would not be high enough to produce the desired results. Furthermore, with such a low frequency current electrolysis is likely to occur at the inner electrode. It is thought that a frequency of anywhere within the range of 1 to 25 or more megacycles will operate satisfactorily. In practice, I have usually employed a frequency on the order of 15 to 20 megacycles. In any event, the important thing is that the electrode structure be so proportioned as to be electrically resonant to the frequency employed.

The juice passing through the electrode structure 3 is usually heated. The difference in temperature of the juice entering and leaving the electrode structure is referred to as the temperature differential. The apparatus has been operated with a temperature differential as high as 40° F., and again it has been operated with a very small temperature differential of not more than one or two degrees F. A temperature differential of 5° to 10° F. gives satisfactory results.

The temperature differential depends, of course, on the rate of flow of the juice through the electrode structure and on the amount of electrical energy supplied by the generator. Apparently the lower the temperature differential, the better the product obtained.

If, as has been done successfully, the temperature differential is held at near zero, such, for example as 1° or 2°, then there is practically no sensible heating of the juice as it passes through the electrode structure. In this case, the electrode structure, to which the high frequency current is supplied, cannot well be described as a heating means. The high frequency energy may have some effect other than heating. For example, the high frequency electrical energy may operate to produce a separation of the water particles or molecules from the other components. It is not known with certainty just what effect the high frequency energy has on the liquid mixture, but the fact is that the application of such high frequency energy to the liquid mixture produces the results described herein.

A vacuum of at least 29″ to 29½″ of mercury is maintained in the evaporating chamber 10 and the water in the jacket 9 is regulated so as to keep the temperature of this chamber at around 75° F. When the liquid mixture is sprayed into this chamber through the spray nozzles 10ᵈ the water present immediately flashes into steam or vapor which is drawn off through the conduit 4ᶜ. As the water vaporizes, it absorbs a large amount of heat and the water jacket 9 is necessary to supply this so-called latent heat of vaporization. Otherwise, the liquid would tend to freeze in the evaporating chamber.

It will be understood that the electrode structure, when operating, is not hot to the touch, and that, when the rate of flow is such as to maintain only a small temperature differential between the inlet and discharge ends, it is difficult to detect any sensible heating. In hot weather, the juice is preferably first refrigerated or cooled, so that it comes into the electrode structure at a temperature no higher than 60° to 65° F. If then it is heated 5° to 10° F. by the electrical energy, it is discharged into the vacuum chamber at about 70° F., at which temperature, under the high vacuum employed, the water flashes into vapor, as above mentioned.

It will be particularly noted that at no point in the cycle does the liquid come in contact with any heating surface hotter than 75° to 80° F. This is in sharp contrast to the temperatures of 130° to 140° F. encountered in the conventional steam evaporators.

By way of example, but in no sense as a limitation, the following figures may be given. With an electrode structure having an outside diameter of 3″ to 4″ and a length of 18″ to 20″, an inner electrode about ¾″ in diameter and 12″ or 14″ long is employed. The pump 2 generates a pressure of around 60 lb. per square inch in the electrode structure and, as above described this is reduced to about 25 lbs. per square inch at the spray head. The rate of flow through the electrode structure may be on the order of 30 gallons per minute, but of course this may be varied by controlling the speed of the pump. The amount of electrical energy supplied to the electrode structure is on the order of 9 kilowatts.

With equipment such as described in the foregoing example, it is possible to produce an orange juice concentrate having a density of as high as 80° Brix, without any caramelization or off flavor. At the same time, owing to the fact that the temperature of the juice at all points is maintained very low, the viscosity is exceptionally low.

Tests have been run, among others, with the whole juice of the pineapple variety of orange, which variety is known to contain a large amount of pectin. At a density of 65° Brix, for example, the viscosity of this concentrate at 75° F. was on the order of 2,000 to 2,500 centipoises. This compares with a viscosity of around 3,500 to 4,000 centipoises for the same concentrate brought to the same density in the conventional steam evaporator. So far as I am aware, I am the first to produce an orange juice concentrate having so high a density combined with such a low viscosity.

This result is due in part at least to the fact that the liquid is heated with absolute uniformity as it passes through the electrode structure, when employing a temperature differential high enough to substantially heat the liquid.

When thus regarding my improved electrode structure as a heating device, it is apparent that the electrical energy is applied across or transversely of the mass of liquid. If the high frequency electrical energy may be regarded as a "current," this current flows radially through the annular mass of liquid, thus uniformly heating all portions thereof. In other words, the same heating effect is applied at all points throughout the mass.

It may be, that, as set forth herein, the water present in the liquid mixture heats first, and faster than the other components. This, as above explained, is due to the relatively high "dielectric constant" of water. So, when I say that all portions of the liquid mixture are "uniformly heated," I mean that there is no zone, point, stratum or layer of the mass that is subjected to any greater heating effect than any other zone, point, stratum or layer, and use of the expression "uniformly heated" is not intended to exclude the possibility that, because of their character, some components distributed through the mass, may be heated faster or more strongly than others.

This idea of "uniformly heating" all portions of the liquid is in sharp contrast to the conventional commercial systems in which steam evaporators are employed. As above mentioned, in these commercial plants, in which the liquid being treated flows through steam heated tubes, the portions or layers of the liquid in direct contact with the hot walls of the tubes are heated to a much higher temperature than the other portions. And this is true, even though the liquid flows along the tubes in the form of a relatively thin film. It is for this reason that, in the case of citrus juice, it is impossible to avoid a certain amount of caramelization, and relatively high viscosity, as the density increases.

Another peculiar fact about the operation of my improved apparatus is that the electrical power supplied falls off as the density rises. Thus the following table shows the variation in kilowatts and in milliamps in the grid circuit of the oscillating tube as the density of the juice rose, the current in the plate circuit remaining constant.

| Density (Brix) | Kilowatts | Grid Milliamps |
| --- | --- | --- |
| 53.0 | 8.2 | 150 |
| 55.0 | 8.2 | 145 |
| 57.0 | 8.0 | 135 |
| 59.0 | 7.4 | 110 |
| 59.0 | 7.4 | 110 |
| 61.0 | 7.8 | 130 |
| 62.2 | 8.4 | 150 |
| 63.0 | 8.5 | 150 |
| 66.0 | 8.0 | 135 |
| 67.0 | 7.6 | 120 |
| 67.5 | 7.4 | 110 |
| 68.0 | 7.2 | 100 |
| 69.5 | 7.0 | 90 |
| 70.0 | 6.7 | 80 |
| 70.7 | 6.7 | 80 |
| 72.0 | 6.6 | 75 |

In FIG. 6, I have illustrated a modified arrangement of electrode structure. In this arrangement, the structure comprises concentric outer and inner spheres 3' and 25', the inner sphere being separated from the outer by suitable braces 49 so that there is an annular space between the two spheres. The liquid enters this space tangentially through pipe 2ª and after whirling around in the annular space escapes through the pipe 3ᵇ, these pipes being disposed at right angles to each other.

In FIG. 7 I have shown a further modified arrangement. In this case, the electrode 25, instead of being enclosed in an outer shell 3 as in the previous figures, is mounted vertically in the bottom wall 50 of the evaporating chamber 10. This electrode 25 is supported by an insulating disc 26, as in FIG. 3, and is connected by conductor 36ª inside the co-axial cable 47 with the high frequency generator 36.

In this arrangement, the level of the liquid in the bottom of evaporating chamber 10 is maintained at a relatively high point so as to keep the electrode 25 immersed, and a glass gauge 22' is provided for indicating the height of the liquid. As before, this arrangement provides an annular space between the central electrode and the wall of the evaporating chamber through which space the liquid being treated circulates. It will be seen that the liquid in this annular space is under slight hydrostatic pressure. The pump draws the liquid from this annular space through pipe 10ᶜ and forces it up to the spray head as before. The effect on the liquid being treated is substantially the same as in the arrangement shown in FIG. 1.

In FIGS. 8 and 9, I have shown still another modified arrangement of electrode structure. This structure comprises an outer cylindrical casing 51, made of metal, having at its ends outturned flanges 52. One end is closed by a metal head 53, secured to the flanges 52 by means of bolts 54. The other end is closed, as in FIG. 3, by an insulating disc 26, secured to the flanges 52, the wall 27 of a suitable cabinet or housing, and a re-enforcing ring 30, by bolts 29. A rod 55 passes centrally through the insulating disc 26, and is secured by clamping nuts 31 working on a threaded portion of the rod. To the inner end of this rod is attached a conducting member 56, in the form of a disc, and a similar parallel conducting disc 57 is supported on the inner end of an alined threaded rod 58, passing through the head 53, and secured thereto by clamping nuts 59. The two conducting discs 56 and 57 are separated a substantial distance apart so as to provide a space between them, and this space is completely enclosed by a cylinder 60, of insulating material having a liquid-tight connection at each end with the conducting discs, thus forming a closed chamber. Inlet and outlet pipes 61 and 62 communicate with this closed space or chamber, and, as clearly shown in FIG. 9, these pipes are disposed tangentially of the cylindrical chamber. They are also located near opposite ends of the chamber, as shown in FIG. 8.

The rod 55, supported by and passing through the insulating disc 26, is connected to one side of a high frequency generator by means of a conductor 36ª, while the other side of the generator is connected by a conductor 36ᵇ with the grounded casing or housing, these conductors preferably constituting a co-axial cable 47, as previously mentioned.

In operation, the liquid being treated is delivered under pressure from a pump, as before, through the inlet pipe 61 into the cylinder 60, which it fills, and then escapes through the outlet pipe 62. Thus the liquid travels longitudinally of the cylindrical space, and also, by virtue of the tangential disposition of the inlet pipe, is given a whirling motion, while so traveling. At the same time, the high frequency electrical energy traverses the mass of liquid within the chamber between the conducting discs 56 and 57.

Figure 10:
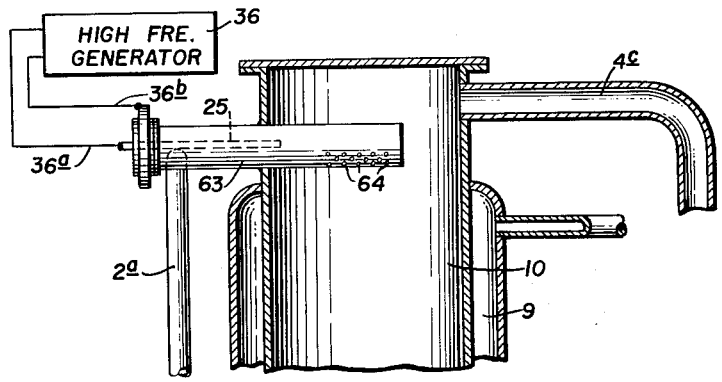
FIGS. 10 and 11 are fragmentary schematic views, similar to the upper part of FIG. 1, but showing yet other modifications of the electrode structure.
Figure 11:
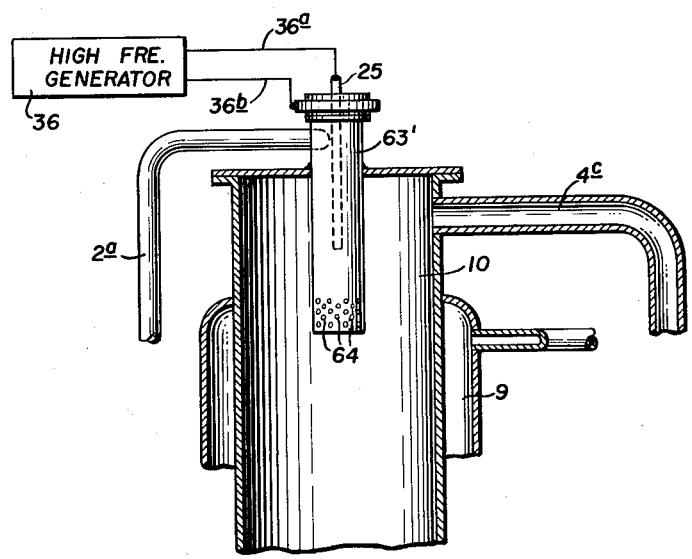

In FIGS. 10 and 11 I have shown apparatus generally similar to the upper part of FIG. 1, but in which the spray head 10ª has been eliminated.

In FIG. 10 the electrode casing 63 is shown as extending horizontally through the side wall of the evaporating chamber 10 and is provided adjacent its inner end with a series of holes or slots 64, formed in the lower half of the casing only, so as to discharge downwardly and laterally. The end of the casing is of course closed.

In FIG. 11 the electrode casing 63' is shown as extending vertically through the top wall of the evaporating chamber 10, to a point well below the vapor take-off pipe 4ᶜ, and is provided at its lower end with a series of holes or slots 64, which may be formed all the way around the casing 63', so long as they are kept below the vapor pipe 4ᶜ.

As in the other figures, the pipe 2ª from the pump preferably delivers the liquid tangentially into the casing 63 or 63', so that it swirls around the electrode 25, and is discharged through the holes or slots 64.

In both FIGS. 10 and 11, the combined area of the holes 64 is such that a substantial pressure is built up in the electrode casing, and the liquid is discharged therefrom in the form of a spray, directed against the walls of the chamber 10.

It will thus be seen that I have devised various forms of electrode structure, which, while differing in details, all operate on the same general principle.

What I claim is:

1. In the application of high frequency electrical energy to liquid materials, means creating a cylindrical closed space having a circular cross-section unobstructed around the axis thereof, means for introducing the liquid materials being treated under pressure into one end of said space tangentially thereof so that they tend to whirl in the free space around the axis thereof, means for discharging said liquid materials from the other end of said space, and means for causing high frequency electrical energy to traverse said liquid materials while confined and whirling within said closed space.

2. In the application of high frequency electrical energy to liquid materials, an electrode structure comprising an outer cylindrical conducting member closed at one end and having a discharge opening at the other, and an inner rod conducting member extending axially thereof, so as to provide an open annular space between them, said rod member being substantially shorter than said outer member and supported at one end only on the closed end of said cylindrical member, means connecting said electrode members to the two poles of a high frequency generator, an inlet pipe connected with said annular space adjacent the closed end of said cylindrical member, and means for causing the liquid material being treated to flow from said inlet pipe into and through said annular space, and out through said discharge opening.

3. An electrode structure as in claim 2 in which the inlet pipe is arranged to introduce the liquid material tangentially of said annular space, so that it tends to whirl around the axis thereof.

4. In the application of high frequency electrical energy to liquid materials, an electrode structure comprising an outer cylindrical conducting member and an inner rod conducting member extending axially thereof, an inlet pipe connected to said cylindrical member at one end thereof, the other end of said cylindrical member merging into a tapering conical portion, an outlet pipe extending axially from the small end of said conical portion, said inner rod member being supported at one end only at that end of said cylindrical member to which said inlet pipe is connected, said rod member being substantially shorter that said cylindrical member and having its free end terminating adjacent but spaced from said tapering conical portion, and means connecting said conducting members with the two poles of a high frequency generator.

5. In the application of high frequency electrical energy to liquid materials, an electrode structure comprising an outer cylindrical conducting member closed at one end by a disc of insulating material, and an inner conducting member in the form of a rod extending axially of said cylindrical member, said rod being substantially shorter than said cylindrical member and supported at one end by said disc, the other end being free, said cylindrical member having a discharge passage at its end adjacent the free end of said rod member, an inlet pipe arranged to deliver liquid tangentially into the said cylindrical member at a point adjacent said disc, and means connecting said conducting members with the two poles of a high frequency generator, the connecting means for the inner conducting member being water-cooled.

References Cited in the file of this patent

UNITED STATES PATENTS

| | | |
|---|---|---|
| 2,446,557 | Schultz et al. | Aug. 10, 1948 |
| 2,489,135 | Himmel et al. | Nov. 22, 1949 |
| 2,494,716 | McMahon et al. | Jan. 17, 1950 |
| 2,582,281 | Robertson | Jan. 15, 1952 |
| 2,589,417 | Mittelmann | Mar. 18, 1952 |

FOREIGN PATENTS

| | | |
|---|---|---|
| 606,165 | Great Britain | Aug. 6, 1948 |

OTHER REFERENCES

Radio Frequency Heating by L. Hartshorn, published by George Allen & Unwin Ltd., London, page 170. (Copy in Div. 37.)

Electronics Magazine, June 1951, pages 126–128.